Sept. 8, 1931.     H. E. PELLETIER     1,822,452
FILTER
Filed Feb. 9, 1925
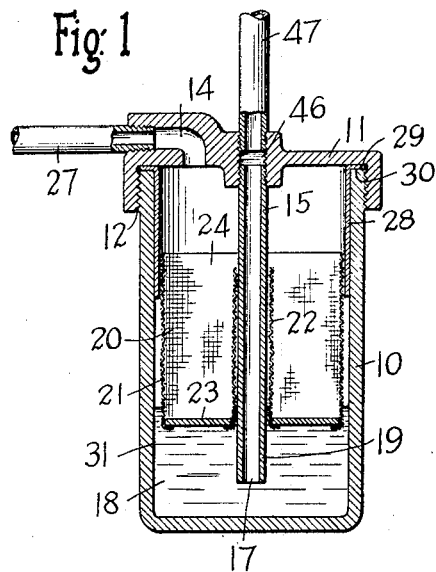
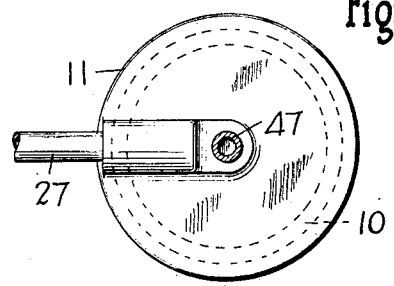
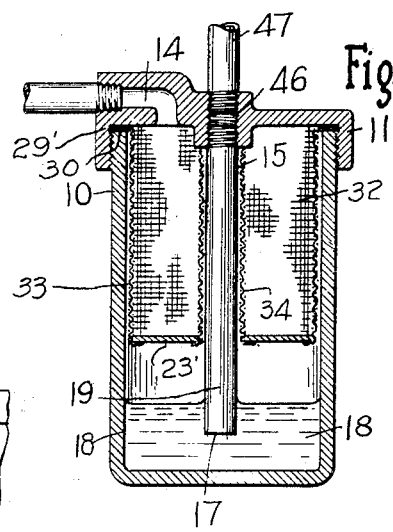
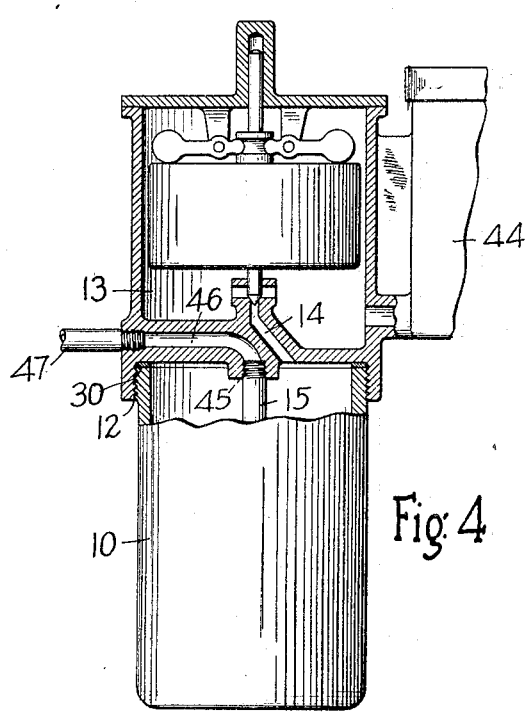
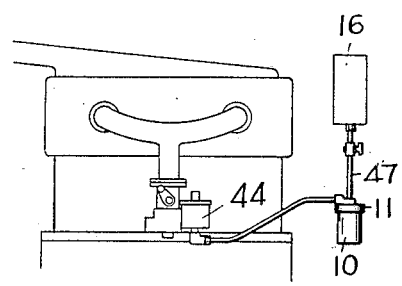
INVENTOR
Henry E. Pelletier
BY
Harry Jacobson
ATTORNEY Patented Sept. 8, 1931

1,822,452

UNITED STATES PATENT OFFICE

HENRY E. PELLETIER, OF JERSEY CITY, NEW JERSEY, ASSIGNOR TO PELCO AUTO PRODUCTS, INC., OF NEW YORK, N. Y., A CORPORATION OF NEW YORK

FILTER

Application filed February 9, 1925. Serial No. 7,742.

This invention relates to filters and separators and particularly to those adapted for insertion in the fuel feed line of an automobile, or adapted to be used in connection with or adjacent to a carburetor, recovery system, or similar apparatus, and to the method of filtering, separating, and recovering and cleansing liquids of different specific gravities which do not mix physically.

In the application thereof to the filtration, separation or recovery of gasoline, my invention contemplates the separation of liquids heavier than gasoline, such as for instance, water, and the separation of all other foreign solid substances from the fuel during the progress thereof through my improved device and contemplates further the passage of the lighter fuel through a quantity of the heavier liquid, whereby foreign liquids are removed from the fuel.

I have found that, particularly in the case of water, the foreign heavier liquid carried by or contained in the gasoline is attracted by the larger bulk of the heavier filtering liquid through which said gasoline is made to pass, and that the gasoline which floats upon the water after its passage therethrough where water is used as a filtering medium is practically entirely free of any of said foreign heavier liquid. In the preferred forms of my invention described and illustrated. I utilize the principle above mentioned by providing a container into which a comparatively small quantity of water is placed. I prefer to feed the gasoline to the bottom of said container whereby said gasoline is made to pass through the water after which the gasoline is strained through a screen impervious to water, but not impervious to the gasoline, which screen excludes any water which may remain in the gasoline from the interior thereof. Preferably near the upper end of the container is an outlet, through which the pure filtered gasoline may be allowed to pass to the carburetor or other device wherein the fuel is collected or utilized. It will be noted that any foreign solids heavier than gasoline which are carried by the fuel before the filtration thereof are eliminated since said solids sink to the lower part of the container, and that any solids such as particles of leaves, twigs and the like which might float in gasoline together with any water remaining therein are strained in a manner which will appear from the description which follows.

In the drawings,

Fig. 1 is a central vertical section of one of the preferred forms of my device.

Fig. 2 is a top plan view of the same.

Fig. 3 is a central vertical section of my device showing a modified form of screen.

Fig. 4 is a partial front elevation and a partial vertical section of my improved device as it appears when used in connection with a carburetor of any of the well known types.

Fig. 5 is a diagrammatic view of part of the gasoline feed system of an automobile showing the preferred arrangement of my device therein.

In the illustrated embodiment of my invention as it appears applied to an automobile, the container member or casing 10 may be provided with a cap as 11 removably screwed to the upper end thereof, or said casing may be removably attached as by the screw threads 12 thereof, directly to the lower end of the float chamber 13 of a carburetor 44 (Fig. 4). The cap 11 or the chamber 13 is provided with an outlet 14 through which the cleansed gasoline passes out to be utilized. The inlet pipe 15 carries the gasoline from a vacuum tank as 16 (Fig. 5), usually provided in automobiles or directly from the main gasoline tank, not shown, to a point near the bottom 17 of the casing. Said inlet pipe is suitably secured as by the threads 45 in a suitably threaded opening 46 in the cap 11 or chamber 13, in which opening is also secured the pipe nipple 47 for connection to the outlet pipe of the vacuum tank 16 or to any other part of the feed line as for instance, close to the supply tank, or between the supply tank and the vacuum tank, as will be understood.

In order that my improved device function to its greatest efficiency for the removal of heavier foreign liquids which affect the value of the gasoline as a fuel, and particularly water, a sufficient amount of a foreign liquid as 18 is poured into the bottom of the casing to cover the end 19 of the inlet pipe 15. The suction of the vacuum tank 16 or the pressure of the gasoline in the fuel tank of the gravity feed system is in either case sufficient to cause the gasoline to flow out of the end 19 of the inlet pipe into the liquid 18, which liquid I will refer to hereinafter as water for convenience. Any particles of water in the gasoline are attracted by the water 18 so that the gasoline which floats or rises to the upper surface of the water 18 is practically free of water. Solid particles are, of course, unable to rise with the gasoline and remain at the bottom of the casing 10.

For insuring the thorough straining or filtration of all foreign matter from the gasoline, in that form of my invention shown in Fig. 1, I provide a float as 20 which cannot sink to the bottom of the casing 10 even though it may be full of gasoline, said float fitting inside the casing 10 leaving a slight space for clearance therebetween. I have shown a preferred form of said float, though I do not wish to be understood as limiting myself to the particular modification shown, as it will be obvious that said float may be made in a variety of forms and of many different kinds of materials without departing from the spirit of my invention. For example, I have shown the float 20 of Fig. 1 as being made of an outer cylindrical member 21 of metallic wire mesh sufficiently finely woven to allow the passage of gasoline therethrough while preventing the passage of water. An inner cylinder 22 of wire mesh or tubing is provided, the inner diameter of which is preferably only slightly greater than the outer diameter of the inlet pipe 15, whereby said pipe serves as a guide for the float in its upward movement in a manner which will soon be explained. While said cylinders 21 and 22 are illustrated in Fig. 1 as being made preferably of wire mesh, said cylinder may, if desired, be made of light solid material without interstices. The bottom 23 of the float is made preferably of a disc to which the cylinders 21 and 22 are suitably joined. It will be understood that the float 20 may be made of light metal, that it may be made of sheet material, that it may be spun into shape or made of cork or the like or of any other suitable material, or of combinations of cork, metal and other material, provided only that the construction is such that water cannot pass therethrough and that the float is made sufficiently light to float in the small quantity of water with which it is intended that my device operate.

It will further be understood that the float will sink down into the water until said float has displaced a volume of water whose weight is equal to the weight of said float, whereafter it will sink no further, irrespective of the fact that said float may be surrounded and filled with gasoline, so that the water touches the under face of the bottom 23, the outer surface of the lower part of the cylinder 21 and the inner surface of the lower part of the cylinder 22 during the operation of my device. The gasoline flowing into the casing 10 does not affect the height of the float, but said gasoline enters the interior 24 of said float through the interstices of the wire mesh of the cylinder 21, whereby floating particles are excluded. After the float is filled, the continued entry of gasoline into the casing 10 causes the level of the filtered and strained gasoline to rise until the level of the outlet 14 is reached whereupon the purified gasoline passes into the outlet pipe 27 ready for use. It will be noted that the clearance between the cylinder 21 of the float 20 and the inner wall of the casing 10 is preferably sufficiently small to prevent any solid floating particle or particle of water from reaching the outlet 14.

By the addition of the water attracted out of the gasoline, the level of the water 18 slowly rises, thereby causing the float 20 to rise with it without interfering with the effective filtration of the gasoline. The inlet pipe 15 is substantially of the diameter of the inside of the tube or cylinder 22, and not only guides said float in the upward movement thereof, but also prevents tilting and consequent sticking of said float during said movement. To further guide the float and to allow proper clearance between the cylinder 21 and the casing 10, I prefer to provide the substantially cylindrical member 28 having an outwardly turned flange 29 adapted to fit over and rest on the upper end 30 of the casing 10, said member 28 preferably fitting easily and somewhat loosely between the inner wall 31 of said casing and the float 20 in the space for clearance above referred to. The flange 29 serves also as a gasket for insuring a gasoline-proof closure between the cap 11 and the casing 10, though a suitable gasket may be provided as well if desired.

In that form of my invention shown in Fig. 3, the float 20 is dispensed with, and in place thereof, I provide the stationary strainer 32, provided with the flange 29' similar to and in the same position as the flange 29 of the member 28. That form of strainer shown in Fig. 3 is preferably formed of a substantially cylindrical wire mesh member 33 impervious to the filtering medium and suitably secured to a bottom 23' and a tubular member 34 also preferably of the same kind of wire mesh secured to said bottom 23'.

It will further be understood that the stationary strainer 32 may be made in any desired geometric shape and of any material suitable for the purposes described, and that said strainer always presents the same effective screening area, no matter to what level the water in the casing 10 rises, since the gasoline readily passes through the water to the screening surface of the strainer.

The gasoline passes through the inlet pipe 15 into the water 18, is filtered by said water, and rises about the strainer 32 in the same manner as has been previously described in connection with the float 20. As the level of the filtered gasoline reaches the wire mesh member 33, said gasoline enters the interior of the strainer, and finally reaches the outlet 14, though solid floating particles and water are excluded from the strainer during the entry of the gasoline through the small openings therein.

It will be seen that my device is peculiarly applicable and advantageous where a constant uninterrupted supply of clean gasoline is of serious importance, as for instance, in machines designed to navigate air or water, such as, airplanes and motor boats. When used in such machines, which must function at all angles and positions, even the inversion of my filter has no effect on the operation thereof. The gasoline still floats on the water and must pass and be filtered therethrough and through the screen before it can enter the outlet pipe. It will also be seen that in the event that the pressure of the gasoline in the supply system is not sufficiently great to drive out any water which may enter the inlet pipe 19, my device nevertheless will function as usual, since the suction of the engine is sufficient to draw the gasoline out of the inlet pipe into the casing and out of the casing to the interior of the float or screen into the outlet pipe, none of the engine suction pressure being lost because of the air-tight closure between the casing and the cap or carburetor.

It will be understood that the casing 10 is to be removed occasionally, to be emptied of water and the collected dirt and a clean supply of water replaced. It will also be understood that water mixtures capable of withstanding low temperatures without freezing may be used in place of pure water, and that while I have described my invention as applied particularly and preferably to the elimination of water and dirt from gasoline, my improved device and method have other uses in the separation, cleansing and recovery of liquids having the same properties as those referred to herein, as will be clear to those skilled in the art.

I do not wish to be understood as limiting myself to the specific construction, arrangement, shape, material, spacing, design or proportions of the example of my invention illustrated and described as it will be obvious that equivalents may be substituted and many changes may be made therein within the scope of the appended claims without departing from the spirit of this invention.

I claim:

1. In a filter, a casing adapted to hold a liquid heavier than that to be filtered in the bottom thereof, an inlet pipe terminating near the bottom of said casing, a screening member impervious to said liquid adapted to float on and to be movably supported by the liquid in said casing and of substantially the same diameter as said casing for preventing the passage of the heavier liquid thereabout, and a removable cap on said casing, said cap having an outlet for the filtered material therein.

2. In a filter, a casing, a cap having an outlet therein removably secured to said casing, an inlet pipe carried by said cap terminating near the bottom of said casing, an annular screening float in said casing, smaller than the inner diameter of said casing, a tubular screening member in said float arranged about said inlet pipe, and a substantially cylindrical flanged guide removably secured in place between said cap and said casing, arranged between said float and the inner wall of said casing and extending to a point in spaced relation to the bottom of said casing.

3. In a filter, a casing, a cap having an outlet therein screwed to the top of said casing, an inlet pipe screwed to said cap and adapted to extend to a point near the bottom of the interior of said casing, and a hollow, floating, metallic screen in said casing for allowing the entry thereinto at all times only of the liquid to be filtered and for excluding heavier liquids and solid particles, said screen extending completely across said casing and communicating with the outlet in the cap only through the upper end thereof and the upper part of the casing.

4. A filter for separating a heavier from a lighter liquid with which it is physically unmixable including in combination, means for continuously feeding the liquid to be filtered to the bottom of said filter, and a metallic, cup-shaped strainer, floating on the heavier liquid, adapted to allow only the entry of the lighter liquid thereinto, said filter having an outlet communicating with the interior of said strainer at the upper end thereof through which the lighter filtered liquid passes only after it has first filled said filter.

5. In a gasoline filter, a liquid for filtering said gasoline, a cylindrical floating screen impervious to and in contact with said liquid and effective for screening the gasoline and completely open at its upper end and a gasoline outlet in the upper end of said filter spaced above the open end of said screen in all positions of said screen.

6. In a filter, a quantity of water for filtering gasoline, and a screen floating in said water and vertically movable thereby for screening said gasoline and for excluding said water from the interior thereof, and extending across the interior of said filter, and means for guiding said screen in the movement thereof.

7. In a gasoline filter, means insertable at any point in the gasoline feed line for filtering the gasoline comprising a cap having an inlet and outlet opening therein, an inlet pipe for the gasoline attached to said cap, a casing, means for preventing leakage between said cap and the upper edge of said casing, a filtering liquid in said casing, a cup-shaped strainer in said casing impervious to said filtering liquid floating in said liquid and of substantially the diameter of the inside of said casing but of less length than said casing.

8. In a filter, liquid means for filtering the gasoline in any position of said filter, a cup-shaped strainer floating in said liquid means and impervious to the filtering liquid for screening the gasoline and maintaining said liquid in contact with the outer one of the surfaces of said strainer at all times, a casing of substantially the diameter of said strainer enclosing said strainer and adapted to be removably secured to a carburetor.

9. A filter adapted to contain a filtering liquid and adapted to function in all angular positions comprising a casing, a cap having an outlet therein removably secured to said casing, and a cup-shaped woven wire strainer in said casing adapted to accumulate filtered and strained gasoline above and in the interior thereof, in communication with said outlet through the upper part of the casing and to maintain said filtering liquid on the outside thereof, said strainer being adapted to float in said filtering liquid and the upper end thereof being open and of substantially the diameter of the inside of said casing.

10. In a filter, a casing adapted to hold a filtering liquid, a cap having an outlet therein removably secured to said casing, a wire cup strainer of substantial length impervious to and floating on said liquid and adapted to maintain said filtering liquid entirely on the outside thereof in any angular position of said filter, and an inlet pipe carried by said cap and passing through said strainer, said outlet communicating with the inside of said strainer only through the upper part of said casing and the upper end of said strainer.

HENRY E. PELLETIER.